(12) United States Patent
Kadry et al.

(10) Patent No.: US 11,810,409 B2
(45) Date of Patent: Nov. 7, 2023

(54) AUTOMOTIVE NETWORK VEHICLE BUS DIAGNOSTICS

(71) Applicant: FORD GLOBAL TECHNOLOGIES, LLC, Dearborn, MI (US)

(72) Inventors: Haysam M. Kadry, Dearborn Heights, MI (US); Amrit Gopal, Ypsilanti, MI (US); Douglas A. Oliver, Redford, MI (US); James Martin Lawlis, Grosse Pointe Farms, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 151 days.

(21) Appl. No.: 17/506,541

(22) Filed: Oct. 20, 2021

(65) Prior Publication Data

US 2023/0122334 A1    Apr. 20, 2023

(51) Int. Cl.
| | |
|---|---|
| *G07C 5/08* | (2006.01) |
| *G06N 20/00* | (2019.01) |
| *B60R 16/023* | (2006.01) |
| *B60W 50/029* | (2012.01) |
| *G07C 5/00* | (2006.01) |
| *B60W 50/02* | (2012.01) |

(52) U.S. Cl.
CPC ........ *G07C 5/0808* (2013.01); *B60R 16/0232* (2013.01); *B60W 50/029* (2013.01); *G06N 20/00* (2019.01); *B60W 2050/0215* (2013.01); *G07C 5/008* (2013.01)

(58) Field of Classification Search
CPC ...... G06N 20/00; G07C 5/0808; G07C 5/008; B60R 16/0232; B60W 50/029; B60W 2050/0215

See application file for complete search history.

(56) References Cited

U.S. PATENT DOCUMENTS

| | | | | |
|---|---|---|---|---|
| 5,532,927 A | * | 7/1996 | Pink | G01R 31/007 702/183 |
| 8,213,321 B2 | * | 7/2012 | Butts | H04L 43/0847 370/242 |
| 9,875,152 B2 | * | 1/2018 | Kessler | G06F 13/426 |
| 2021/0058168 A1 | * | 2/2021 | Zang | H04B 17/29 |

* cited by examiner

*Primary Examiner* — Sizo B Vilakazi
(74) *Attorney, Agent, or Firm* — Frank Lollo; Brooks Kushman P.C.

(57) ABSTRACT

Performing in-vehicle network diagnostics is provided. A cloud system receives wiring diagnostic data from a vehicle. The wiring diagnostic data includes information with respect to electrical operation of a plurality of segments of wiring of the vehicle. A machine-learning model of the cloud system is utilized to analyze the wiring diagnostic data. Responsive to the machine-learning model identifying an issue with the electrical operation based on the wiring diagnostic data, a response is sent from the cloud system to the vehicle, the response including one or more corrective actions to be performed by the vehicle to address the issue.

20 Claims, 5 Drawing Sheets

AUTOMOTIVE NETWORK VEHICLE BUS DIAGNOSTICS

TECHNICAL FIELD

Aspects of the disclosure generally relate to built-in diagnostics for an in-vehicle network.

BACKGROUND

Vehicle components send and receive data over vehicle wiring such as controller area network (CAN) or Ethernet wiring. Initially, or in other cases over time, the vehicle wiring may become unreliable. This may affect the transfer of the data over the vehicle wiring. Time-domain reflection (TDR) is technique for determining characteristics of electrical wiring by providing an electronic pulse along the wiring and observing the reflected waveform. By identifying the timing or other characteristics of the reflected waveform, a location of an issue in the wiring may be identified.

SUMMARY

In one or more illustrative examples, a system for performing in-vehicle network diagnostics is provided. The system includes one or more cloud servers. The one or more cloud servers are programmed to receive, from a vehicle, wiring diagnostic data that includes information with respect to electrical operation of a plurality of segments of wiring of the vehicle; utilize a machine-learning model to analyze the wiring diagnostic data; and responsive to the machine-learning model identifying an issue with the electrical operation based on the wiring diagnostic data, send a response including one or more corrective actions to be performed by the vehicle to address the issue.

In one or more illustrative examples, a method for performing in-vehicle network diagnostics is provided. A cloud system receives wiring diagnostic data from a vehicle. The wiring diagnostic data includes information with respect to electrical operation of a plurality of segments of wiring of the vehicle. A machine-learning model of the cloud system is utilized to analyze the wiring diagnostic data. Responsive to the machine-learning model identifying an issue with the electrical operation based on the wiring diagnostic data, a response is sent from the cloud system to the vehicle, the response including one or more corrective actions to be performed by the vehicle to address the issue.

In one or more illustrative examples, a non-transitory computer-readable medium comprising instructions for performing in-vehicle network diagnostics that, when executed by one or more cloud servers, cause the one or more cloud servers to perform operations including to receive, from a vehicle, wiring diagnostic data that includes information with respect to electrical operation of a plurality of segments of wiring of the vehicle, the wiring diagnostic data including cable diagnostic details for the plurality of segments of wiring determined using time-domain reflectometer (TDR) functionality of the vehicle integrated into vehicle controllers and/or inline with the plurality of segments of wiring, the cable diagnostic details including measured link quality using the TDR functionality for each of a plurality of the segments of wiring and length of cabling for each of the plurality of segments of wiring; utilize a machine-learning model to analyze the wiring diagnostic data; and responsive to the machine-learning model identifying an issue with the electrical operation based on the wiring diagnostic data, send a response including one or more corrective actions to be performed by the vehicle to address the issue.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The inclusion of higher-speed in-vehicle networks into vehicles, such as automotive Ethernet, introduces complexity in wiring diagnostics. A vehicle may be wired with Ethernet cabling, such as jacketed unshielded parts of wires between components. Such a networks may be more susceptible to issues with poor cabling than lower throughput networks such as controller area network (CAN).

Features may be designed into the automotive physical layer to conduct wiring diagnostics and to log any identified issues such as wire discontinuities and link quality over time. For instance, some physical bus implementations may perform diagnostics on cabling using built-in time-domain reflectometer (TDR) functionality. This may be used to determine signal quality statuses or signal quality indications (SQI) for the various segments of Ethernet cabling within the vehicle. A trained neural network may receive such wiring diagnostics and may be used to identify and/or predict potential wiring issues. Further aspects of the disclosure are described in detail herein.

Figure 1:
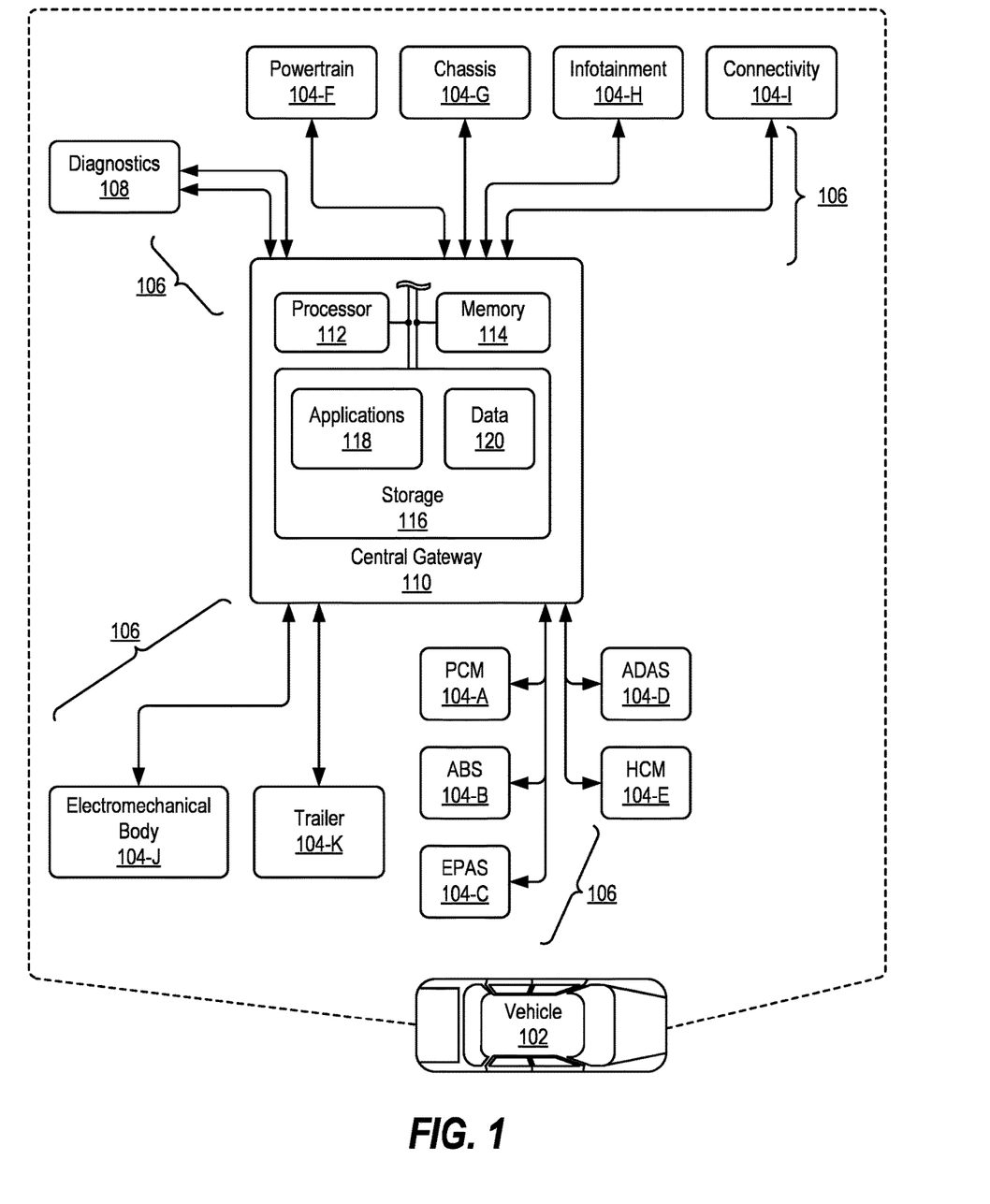
FIG. 1 illustrates an example system including a central gateway configured for use in providing in-vehicle network diagnostics.

FIG. 1 illustrates an example system 100 including a central gateway 110 configured for providing in-vehicle network diagnostics. The central gateway 110 may be connected to a plurality of electronic control units (ECUs) 104 over one or more vehicle buses 106. The central gateway 110 may also include one or more diagnostic ports 108. The central gateway 110 may include a processor 112, a memory 114, and a storage 116 for applications 118 and/or data 120. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors. In another example, the vehicle 102 may be a pure electric vehicle driven by electric motors only.

The vehicle 102 may include a plurality of electronic control units (ECUs) 104 configured to perform and manage various vehicle 102 functions under the power of the vehicle battery and/or drivetrain. As depicted, the example vehicle ECUs 104 are represented as discrete ECUs 104-A through 104-H. However, the vehicle ECUs 104 may share physical hardware, firmware, and/or software, such that the functionality from multiple ECUs 104 may be integrated into a single ECU 104 or distributed across a plurality of ECUs 104. The vehicle ECUs 104 may include various vehicle 102 components configured to receive updates of associated software, firmware, or configuration settings.

As some non-limiting vehicle ECUs 104 examples: a powertrain control module (PCM) 104-A may be configured to control engine and transmission components; an antilock brake system (ABS) 104-B controller configured to control brake and traction control components; an electric power-assisted steering (EPAS) 104-C controller configured to control steering assistance and adjust pull or drift compensation functions; advanced driver assistance systems (ADAS) 104-D such as adaptive cruise control or automate braking; and a headlamp control module (HCM) 104-E configured to control light on/off settings. The ECUs 104 may also include other powertrain 104-F or chassis 104-G components, an infotainment system 104-H configured to support voice command and BLUETOOTH interfaces with the driver and driver carry-on devices (e.g., the SYNC system provided by Ford Motor Company of Dearborn, MI), a connectivity controller 104-I such as a telematics control unit (TCU) configured to utilize an embedded modem to access networked devices external to the vehicle 102, electromechanical body controllers 104-J such as window or lock actuators, and trailer controller 104-K components such as light control and sensor data to support connected trailers.

The vehicle bus 106 may include various methods of communication available between the vehicle ECUs 104. The vehicle bus 106 may also support communication between the central gateway 110 and the vehicle ECUs 104. As some non-limiting examples, the vehicle bus 106 may be a vehicle controller area network (CAN), an Ethernet network, or a media oriented system transfer (MOST) network. The CAN network or networks may be various types, including, but not limited to, high speed CAN (HS-CAN) having a data capacity of up to 500 kbps, mid-speed CAN (MS-CAN) having a data capacity of up to 125 kbps, and/or CAN flexible data rate (FD-CAN) having a data capacity of up to 2000 kbps or higher. It should be noted that the illustrated bus topology is merely an example, and other numbers and arrangements of vehicle buses 106 may be used. These vehicle buses 106 may be implemented as a series of segments of wiring. For instance, a vehicle bus 106 may include a plurality of segments of wiring from the central gateway 110 to an end location.

The vehicle 102 may further include diagnostic ports 108 that may be used by external devices to monitor the status of the vehicle 102. In an example, the diagnostic port 108 may be an on-board diagnostics (OBD) port connected to the vehicle bus 106. A user may connect a dongle, code reader, or other scan device to the diagnostic port 108, and may use the connection provided by the diagnostic port 108 to gain access to messages traversing the vehicle bus 106. Once connected, a user may utilize the connected scan device to capture diagnostic codes, monitor vehicle health, or, in some cases, adjust vehicle settings. Similar to the speed of HS-CAN, the CAN diagnostic ports 108 may support data capacity of up to 500 kbps. In another example, the diagnostic port 108 may be a diagnostic over Internet Protocol (DoIP) port 124, and may provide access to messages traversing the vehicle bus 106 via Ethernet rather than via the OBD standard. A DoIP port 124 may support a higher data rate than CAN, as Ethernet using TCP/IP 64-byte payload can support data rates of approximately 45 Mbps, and with 1460-byte payloads can support data rates of approximately 95 Mbps.

The central gateway 110 may be configured to provide an electrical interface between the vehicle buses 106 used to communicate within the vehicle 102. In an example, the central gateway 110 may be configured to translate signals and commands between CAN and/or in-vehicle Ethernet vehicle buses 106 connected to the central gateway 110. For instance, the central gateway 110 may support connection to up to ten CAN vehicle buses 106 and up to seven Ethernet vehicle buses 106. By supporting Ethernet in addition to CAN, the central gateway 110 may be able to provide support for higher-speed in-vehicle network communication, while still performing existing or legacy gateway functions within the vehicle 102.

As a specific non-limiting example, the central gateway 110 may be connected to the powertrain 104-F components over a HS-CAN vehicle bus 106; to the chassis components 104-G, safety systems and a cluster over a second HS-CAN vehicle bus 106; to the infotainment system 104-H over a third HS-CAN vehicle bus 106; to the connectivity 104-I and Ethernet security backup systems over a fourth HS-CAN vehicle bus 106; to the electromechanical body controllers 104-J over a first MS-CAN bus; to the trailer controller 104-K and/or nodes readily accessed from the exterior of the vehicle 102 over a second MS-CAN vehicle bus 106; to a diagnostic port 108 over first and second diagnostic data vehicle bus 106 connections; to the PCM 104-A, ABS 104-B, EPAS 104-C, and other controllers over a first FD-CAN vehicle bus 106; and to the ADAS 104-D, HCM 104-E and other controllers over a second FD-CAN vehicle bus 106. For instance, the infotainment 104-H, connectivity 104-I, cluster 104-L, heads-up display 104-M, and ADAS 104-D are each connected to the central gateway 110 via separate 2-wire 100 Mbsp Ethernet vehicle buses 106. In yet another example the heads-up display 104-M may be integrated with the cluster 104-L.

The central gateway 110 may be further configured to provide computing functionality in support of the domain CAN messaging of the vehicle 102. For instance, the central gateway 110 may include one or more processors 112 configured to perform instructions, commands, and other routines in support of the processes described herein. In an example, the central gateway 110 may be configured to execute instructions of applications 118 loaded to a memory 114 of the central gateway 110 from a storage medium 116 of the central gateway 110. The applications 118 may include software code programmed to support the operation of the central gateway 110 discussed in detail herein. For instance, the applications 118 may include software code to facilities the collection of data 120 from the vehicle 102, the sending of the data 120, and the receipt of commands from a remote source for execution. The computer-readable medium 116 (also referred to as a processor-readable medium or storage) includes any non-transitory medium (e.g., a tangible medium) that participates in providing instructions or other data that may be read by the processor 112 of the central gateway 110. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. As one specific example, the central gateway 110 may be provisioned with at least 128 megabytes of RAM, as well as 2-4 cores of processor 112 for processing power to enable various computing tasks.

Figure 2:
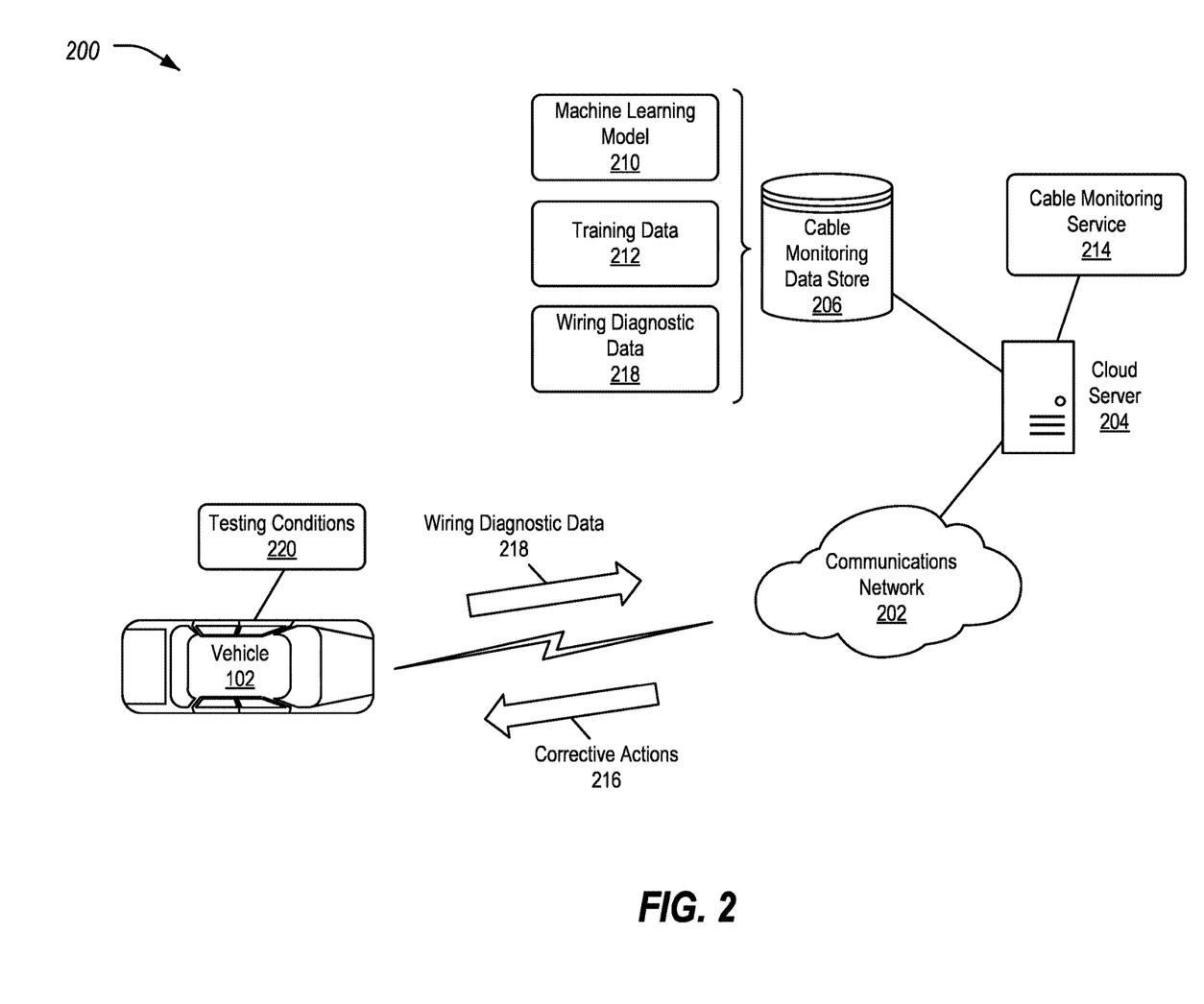
FIG. 2 illustrates the vehicle of FIG. 1 in the context of a system for performing in-vehicle network diagnostics.

FIG. 2 illustrates the vehicle 102 of FIG. 1 in the context of a system 200 for performing in-vehicle network diagnostics. As noted above, the vehicle 102 may include a connectivity controller 104-I such as a TCU to communicate over a communications network 202 with a cloud server 204. The cloud server 204 is configured to host a cable monitoring date store 206 maintaining a machine-learning model 210 and training data 212 as well as a cable monitoring service 214 configured to receive wiring diagnostic data 218 from vehicles 102 and utilize the machine-learning model 210 to provide corrective actions to the vehicles 102 based on an analysis of the wiring diagnostic data 218 by the machine-learning model 210. It should be noted that the system 200 is an example, and systems 200 having more, fewer, or different elements may be used.

The communications network 202 may provide communications services, such as packet-switched network services (e.g., Internet access, voice over Internet Protocol (VoIP) communication services), to devices connected to the external communications network 202. An example of the external communications network 202 is a cellular telephone network. For instance, the connectivity controller 104-I may access the cellular network via connection to one or more cellular towers. To facilitate the communications over the communications network 202, the connectivity controller 104-I may be associated with unique device identifiers (e.g., mobile device numbers (MDNs), Internet protocol (IP) addresses, etc.) to identify the communications of the connectivity controller 104-I on the communications network 202 as being associated with the vehicle 102.

The cloud server 204 may include various types of computing apparatus, such as a computer workstation, a server, a desktop computer, a virtual server instance executed by a mainframe server, or some other computing system and/or device. Computing devices, such as the cloud server 204, generally include a memory on which computer-executable instructions may be maintained, where the instructions may be executable by one or more processors of the computing device. Such instructions and other data may be stored using a variety of computer-readable media. A computer-readable medium (also referred to as a processor-readable medium or storage) includes any non-transitory (e.g., tangible) medium that participates in providing data (e.g., instructions) that may be read by a computer (e.g., by the processor of the cloud server 204). In general, processors receive instructions, e.g., from the memory via the computer-readable storage medium, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, JavaScript, Perl, etc.

A cable monitoring data store 206 may be one such application included on the storage of the cloud server 204. The cable monitoring data store 206 may include instructions that, when loaded into memory and executed by the cloud server 204, cause the cloud server 204 to perform database functionality including the storage, update, and retrieval of relational information. Databases or data repositories such as the cable monitoring data store 206 may include various kinds of mechanisms for storing, accessing, and retrieving various kinds of data (such as the cable monitoring data store 206), including a hierarchical database, a set of files in a file system, an application database in a proprietary format, a relational database management system (RDBMS), etc. An RDBMS may employ structured query language (SQL), for instance, in addition to a language for creating, storing, editing, and executing stored procedures. In an example, data such as the wiring diagnostic data 208, the machine-learning model 210, the training data 212, and the corrective actions 216, may be stored.

Figure 3:
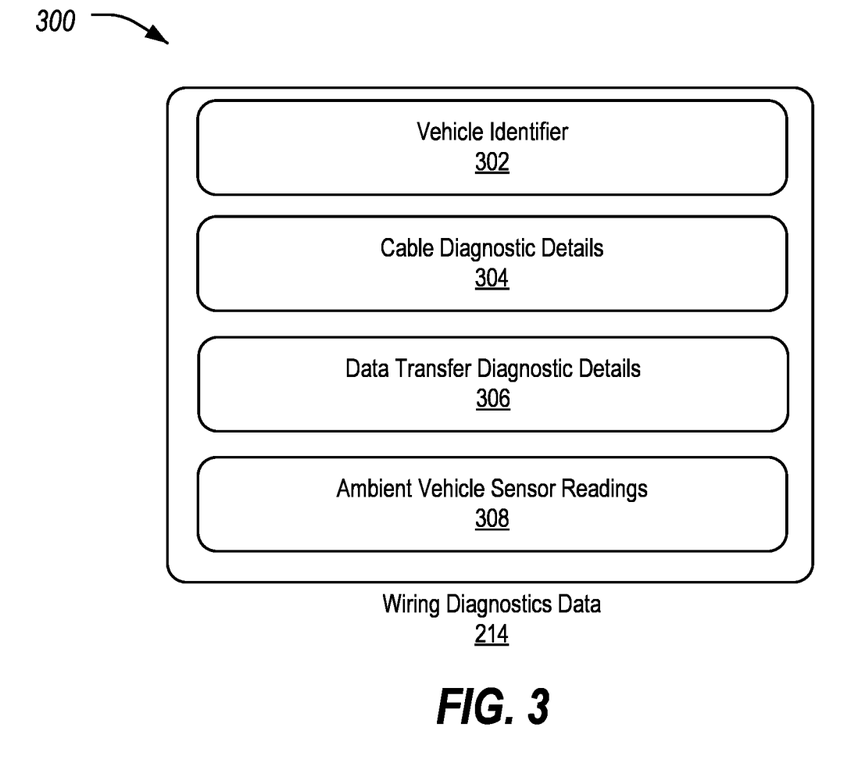
FIG. 3 illustrates an example of wiring diagnostic data.

The wiring diagnostic data 208 may include information sent from the vehicle 102 over the communications network 202 to the cloud server 204 for use in performing the performing in-vehicle network diagnostics. FIG. 3 illustrates an example 300 of wiring diagnostic data 208. As shown in FIG. 3, and with continuing reference to FIG. 2, in an example the wiring diagnostic data 208 may include an identifier 302 of the vehicle 102 (such as a VIN), cable diagnostic details 304, data transfer diagnostic details 306, and/or ambient vehicle sensor readings 308.

The cable diagnostic details 304 of the wiring diagnostic data 208 may include information with respect to the electrical operation of the one or more segments of wiring of the vehicle buses 106 of the vehicle 102. For instance, some physical bus implementations of the vehicles 102 may perform diagnostics on the vehicle cabling using built-in time-domain reflectometer (TDR) functionality. Such functionality may be built into one or more of the ECUs 104 of the vehicle 102. In other examples, such functionality may be included inline along the vehicle cabling, such as at various nodes along a wiring run. In the case of a disconnection or intermittent connection, the TDR information may provide an approximate length along the given wiring run at which there is open or short location.

Figure 4:
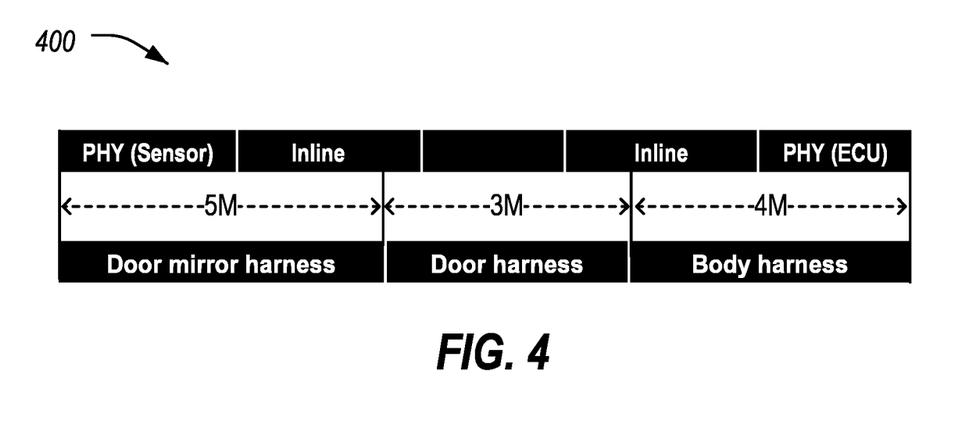
FIG. 4 illustrates an example of a portion of a wiring run of a vehicle of the vehicle.

FIG. 4 illustrates an example 400 of a portion of a wiring run of a vehicle 106 of the vehicle 102. As shown in FIG. 4, the run includes three portions: a door mirror wiring harness, connected to a door wiring harness, in turn connected to a body wiring harness. The TDR functionality to monitor these three segments of wiring may be included in various components of the wiring run. For instance, the TDR functionality may be included in a sensor on the door mirror harness to allow measurement from the sensor endpoint of the wiring run, inline along the wiring to measure between nodes along the wiring run, and/or within an ECU 104 to which the wiring run connects to allow measurement from the ECU 104 endpoint.

In an example, the cable diagnostic details 304 may include a table including measured link quality (e.g., using the TDR functionality) as well as length of cabling for each of the segments of the vehicle 102. For instance, for the illustrated portion of the wiring run, this may include an indication of the five meter length and measured link quality of the door mirror wiring harness segment, the three meter length and measured link quality of the door wiring harness segment, and the four meter length and measured link quality of the connected to a body wiring harness segment.

Referring back to FIG. 3, the data transfer diagnostic details 306 of the wiring diagnostic data 208 may include information with respect to the data transfers along with vehicle buses 106, such as channel quality (e.g., bit error rate (BER), signal-to-noise ratio (SNR), link up-time, etc.) for each of a plurality of segments of the vehicle buses 106. This additional information may provide data to help identify root causes of sporadic issues as well as to determine overall network health over time.

The ambient vehicle sensor readings 308 of the wiring diagnostic data 208 may include information from other sensors of the vehicle 102. This may include, for instance, temperature or other weather information; speed, acceleration, or other information with respect to movement of the vehicle 102; day, time of day, etc. Such factors may also be useful to aid in identifying conditions during which intermittent issues occur.

Referring back to FIG. 2, the machine-learning model 210, such as a trained neural network, may be used to perform detection of cable issues based on the wiring diagnostic data 218 received from the vehicle 102. In general, the machine-learning model 210 may receive the wiring diagnostic data 218 as an input and may use that data to output whether or not any issues were identified with the vehicle 102. For instance, the machine-learning model 210 may utilize the wiring diagnostic data 218 to determine link quality based on gathered statistical data for other vehicles 102 and/or to identify any outlier data points.

The machine-learning model 210 may be trained using training data 212. The training data 212 may include wiring diagnostic data 208 labeled to indicate link quality for the training data 212. This data may be used, in a training phase, to allow for adjustable parameters in the machine-learning model 210 such as weights and biases to be adjusted to allow the machine-learning model 210 to provide accurate outputs.

A cable monitoring service 214 may be an application or library included on the storage of or otherwise accessible by the cloud server 204. When accessed, the cable monitoring service 214 may be configured to request or otherwise receive the wiring diagnostic data 218 from the vehicles 102. The cable monitoring service 214 may apply the received wiring diagnostic data 218 to the machine-learning model 210 to determine whether the wiring diagnostic data 218 is indicative of a current or future likely wiring issue with the vehicle 102.

Responsive to an issue being determined by the cable monitoring service 214, the cable monitoring service 214 may send one or more corrective actions 216 to the vehicle 102. The corrective actions 216 may include, as some examples, an indication to tell the vehicle 102 to seek service, a new routing of vehicle 102 data along a more reliable wiring segment within the vehicle 102 to avoid a segment having issues, and/or an update to a configuration of the vehicle 102 to reduce data speeds or update interval to otherwise adjust data traffic to mitigate issues with the segment having issues.

The cable monitoring service 214 may also be configured to incorporate the wiring diagnostic data 218 into the training data 212 to allow for retraining and improvement of the machine-learning model 210. By having additional training data 212 from live vehicles 102, the machine-learning model 210 may be retrained to improve its performance over time.

For instance, responsive to determining an issue with a vehicle 102, the cable monitoring service 214 may pull earlier wiring diagnostic data 218 from that vehicle 102 before the issue was detected. By analyzing characteristics of vehicles before the issue occurs, the cable monitoring service 214 may be able to offer prognostics with respect to expected maintenance issues or end-of-life of various wiring components. These prognostics may be used to warn of issues before they occur, and/or to identify places to make changes to the vehicle 102 design or assembly to improve the lifespan of vehicle 102 components.

In some examples, the vehicle 102 may maintain data inductive of testing conditions 220 defining when the vehicle 102 should send the wiring diagnostic data 208 to the cable monitoring system 214 for testing. For instance, the testing conditions 220 may indicate for the vehicle 102 to send the wiring diagnostic data 208 responsive to the vehicle 102 being in a plant mode (e.g., being built). As one possibility, as the vehicle 102 is being assembled and reaches various stations, the vehicle 102 may provide its wiring diagnostic data 208 to the cable monitoring system 214 for testing. This may allow for wiring issues to be diagnosed as the vehicle 102 is being built, before completion of final assembly. By doing so, issues may be more easily corrected before the vehicle 102 assembly is completed.

In another example, the vehicle 102 may be part of a vehicle fleet, and the testing conditions 220 may indicate fleet-specific timing conditions for the vehicle 102 to send the wiring diagnostic data 208 to the cable monitoring system 214 for testing. For instance, the fleet may specify testing conditions 220 for the vehicle 102 to send the wiring diagnostic data 208 one or more of upon vehicle startup, every day, week, month, after travel of a predefined distance, responsive to return of the vehicle 102 from a user, responsive to assignment of the vehicle 102 to a user, responsive to raising of a diagnostic code by one of the ECUs 104 of the vehicle 102, etc. These testing conditions 220 may be pushed to the vehicle 102 by a fleet operator, in an example.

In yet a further example, the vehicle 102 may have user-defined testing conditions 220 for the vehicle 102 to send the wiring diagnostic data 208 one or more of upon vehicle startup, every day, week, month, after travel of a predefined distance, responsive to occurrence of a DTC, etc. These testing conditions 220 may be applied to the vehicle 102 by a vehicle owner, in an example, e.g., using the user's mobile device or using the vehicle 102 HMI. In yet another example, the vehicle 102 may send the wiring diagnostic data 208 responsive to receipt of a request to do so, e.g., from the cable monitoring system 214, from a mobile device of a user or fleet manager of the vehicle 102, etc.

Figure 5:
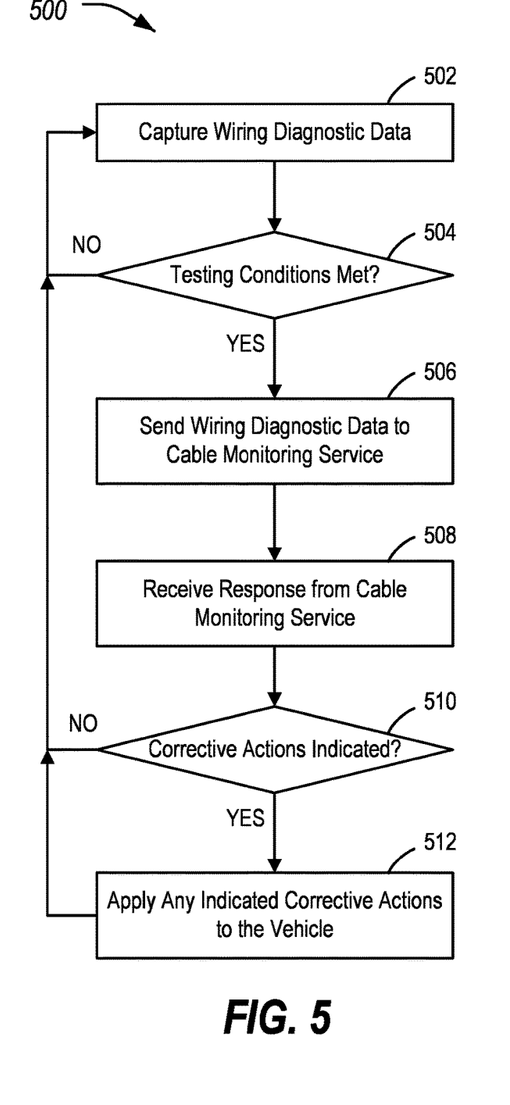
FIG. 5 illustrates an example process for the vehicle performing in-vehicle network diagnostics.

FIG. 5 illustrates an example process 500 for the vehicle 102 performing in-vehicle network diagnostics. In an example, the process 500 may be performed by the vehicle 102 in communication with the cable monitoring system 214 in the context of the system 200.

At operation 502, the vehicle 102 captures wiring diagnostic data 208. In an example, as discussed with respect to FIGS. 3-4, the vehicle 102 may capture the cable diagnostic details 304, data transfer diagnostic details 306, and/or ambient vehicle sensor readings 308, as noted above.

At operation 504, the vehicle 102 determines whether the testing conditions 220 are met. In an example, the testing conditions 220 may specify one or more conditions to cause the vehicle 102 to send the captured wiring diagnostic data 208 to the cable monitoring system 214. These may include, for example as discussed above, the vehicle 102 being in a plant mode, the vehicle 102 reaching various stations during assembly, fleet-specific timing conditions for the vehicle 102, and/or user-defined testing conditions 220 for the vehicle 102. If the testing conditions 220 are met, control passes to operation 506. Otherwise, control returns to operation 502.

At operation 506, the vehicle 102 sends the wiring diagnostic data 208 to the cable monitoring system 214. In an example, the connectivity controller 104-I of the vehicle 102 may send the wiring diagnostic data 208 over the communications network 202 to the cloud server 204 hosting the cable monitoring service 214. Details of performing in-vehicle network diagnostics by the cable monitoring service 214 are discussed in further detail with respect to the process 600 in FIG. 6.

At operation 508, the vehicle 102 receives a response from the cable monitoring system 214. In an example, the connectivity controller 104-I of the vehicle 102 may receive over the communications network 202, from the cloud server 204 hosting the cable monitoring service 214, a result of processing of the wiring diagnostic data 208.

At operation 510, the vehicle 102 determines whether any corrective actions 216 were indicated in the response to the vehicle 102. For instance, in some examples the cable monitoring system 214 may determine that the vehicle 102 is functioning appropriately. In such cases, the cable monitoring system 214 may provide a response to the vehicle 102 (or to a device of an owner or fleet operator of the vehicle 102) indicating that the vehicle 102 is operating property. In other examples, the response may include an indication that the vehicle 102 has an issue. In such a case, the response may also indicate one or more corrective actions 216 to be implemented by the vehicle 102. These corrective actions 216 may include, as discussed above, an indication to tell the vehicle 102 to seek service, a new routing of vehicle 102 data along a cleaner wiring segment within the vehicle 102 to avoid a segment having issues, and/or an update to a configuration of the vehicle 102 to reduce data speeds or update interval to otherwise adjust data traffic to mitigate issues with the segment having issues. If corrective actions 216 are indicated, control passes to operation 512. Otherwise, control returns to operation 502.

After operation 512, the vehicle 102 applies the corrective actions 216 to the vehicle 102. In an example, the central gateway 110 and/or one or more ECUs 104 of the vehicle may implement the corrective actions 216. This may include, for instance, changing the routing of signals along the vehicle bus 106, reduce data speeds or update interval to otherwise adjust data traffic to mitigate issues, etc. After operation 512, control passes to operation 502.

Figure 6:
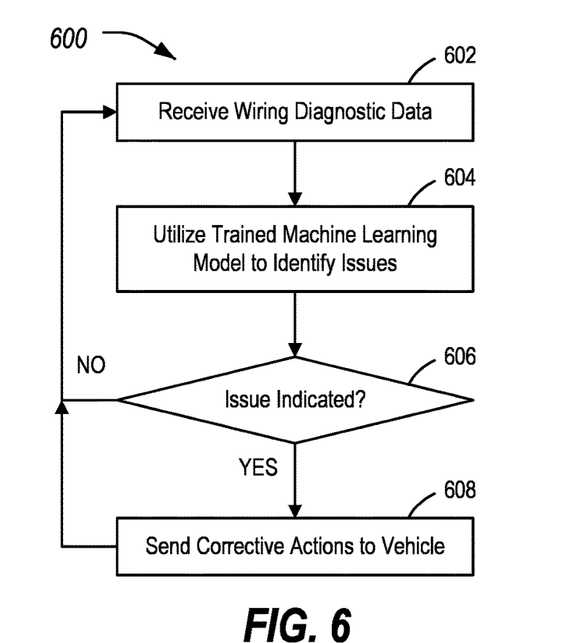
FIG. 6 illustrates an example process for the cable monitoring system performing in-vehicle network diagnostics.

FIG. 6 illustrates an example process 600 for the cable monitoring system 214 performing in-vehicle network diagnostics. In an example, the process 600 may be performed by the cable monitoring system 214 in communication with the vehicle 102 in the context of the system 200.

At operation 602, the cable monitoring system 214 receives wiring diagnostic data 208 from the vehicle 102. In an example, the cable monitoring system 214 receives the wiring diagnostic data 208 over the communications network 202 as discussed above with respect to operation 506 of the process 500. The cable monitoring system 214 may store the store the wiring diagnostic data 208 to the cable monitoring data store 206 for processing.

At operation 604, the cable monitoring system 214 utilizes the trained machine-learning model 210 to identify issues with the received wiring diagnostic data 208. In an example, the cable monitoring system 214 utilizes the machine-learning model 210 to provide corrective actions to the vehicles 102 based on an analysis of the wiring diagnostic data 218 by the machine-learning model 210. For instance, the machine-learning model 210 may utilize the wiring diagnostic data 218 to determine link quality based on gathered statistical data for other vehicles 102 and/or to identify any outlier data points that may be indicative of issues with the wiring of the vehicle 102. The machine-learning model 210 may be trained as discussed above and also below with respect to the process 700 in FIG. 7.

At operation 606, if an issue is indicated, the cable monitoring system 214 passes control to operation 608 to send corrective actions 216 to the vehicle 102 at operation 608. In an example, the cable monitoring system 214 sends the corrective actions 216 as discussed above with respect to operation 508 of the process 500. If no issue is indicated, then the cable monitoring system 214 may optionally also send a response indicating that no issues were indicated. Regardless, after operation 608, or after determining that no issues were indicated, control passes to operation 602.

Figure 7:
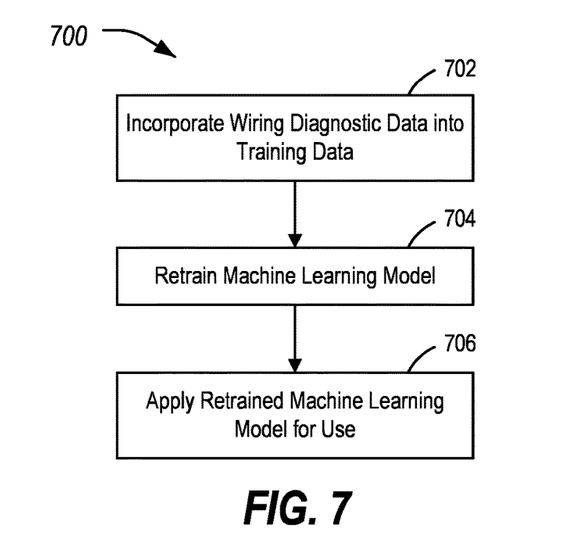
FIG. 7 illustrates an example process for the cable monitoring system retraining the machine-learning model to improve the in-vehicle network diagnostics.

FIG. 7 illustrates an example process 700 for the cable monitoring system 214 retraining the machine-learning model 210 to improve the in-vehicle network diagnostics. In an example, as with the process 600, the process 700 may be performed by the cable monitoring system 214 in communication with the vehicle 102 in the context of the system 200.

At operation 702, the cable monitoring system 214 incorporates received wiring diagnostic data 208 into the training data 212. The training data 212 may include wiring diagnostic data 208 labeled to indicate link quality for the training data 212. Additionally, by having additional training data 212 from live vehicles 102, the machine-learning model 210 may be retrained to improve its performance over time. For instance, responsive to determining an issue with a vehicle 102, the cable monitoring service 214 may pull earlier wiring diagnostic data 218 from that vehicle 102 before the issue was detected and label this data as predictive of a possibility of a future issue. By analyzing characteristics of vehicles 102 before the issue occurs, the cable monitoring service 214 may be able to offer prognostics with respect to expected maintenance issues or end-of-life of various wiring components. These prognostics may be used to warn of issues before they occur, and/or to identify places to make changes to the vehicle 102 design or assembly to improve the lifespan of vehicle 102 components.

At operation 704, the cable monitoring system 214 retrains the machine-learning model 210. For instance, using the training data 212 incorporating the received wiring diagnostics data 208, the cable monitoring system 214 may adjust parameters in the machine-learning model 210, such as weights and biases, to allow the machine-learning model 210 to provide accurate results in accordance with the labeled outputs in the training data 212.

At operation 706, the cable monitoring system 214 applies the retrained machine-learning model 210 for use. For example, the retrained machine-learning model 210 may be used at operation 604 of the process 600 to improve the functioning of the cable monitoring system 214. After operation 706, the process 700 ends.

Thus, the disclosed approaches allow a technician to identify an exact segment of wiring that is at issue. This may allow for an easy determination of the location of a loose terminal or damaged cable or enclosure in case of a sporadic issue. Moreover, the disclosed approaches may further provide an ability to predict and record vehicle bus 106 health over time. In one enhancement, the system 200 may collect cable aging data based on predefined factors such as variation due to heat exposure over time, and may use that information to predict cabling performance variation due to heat, electromagnetic compatibility, etc.

Figure 8:
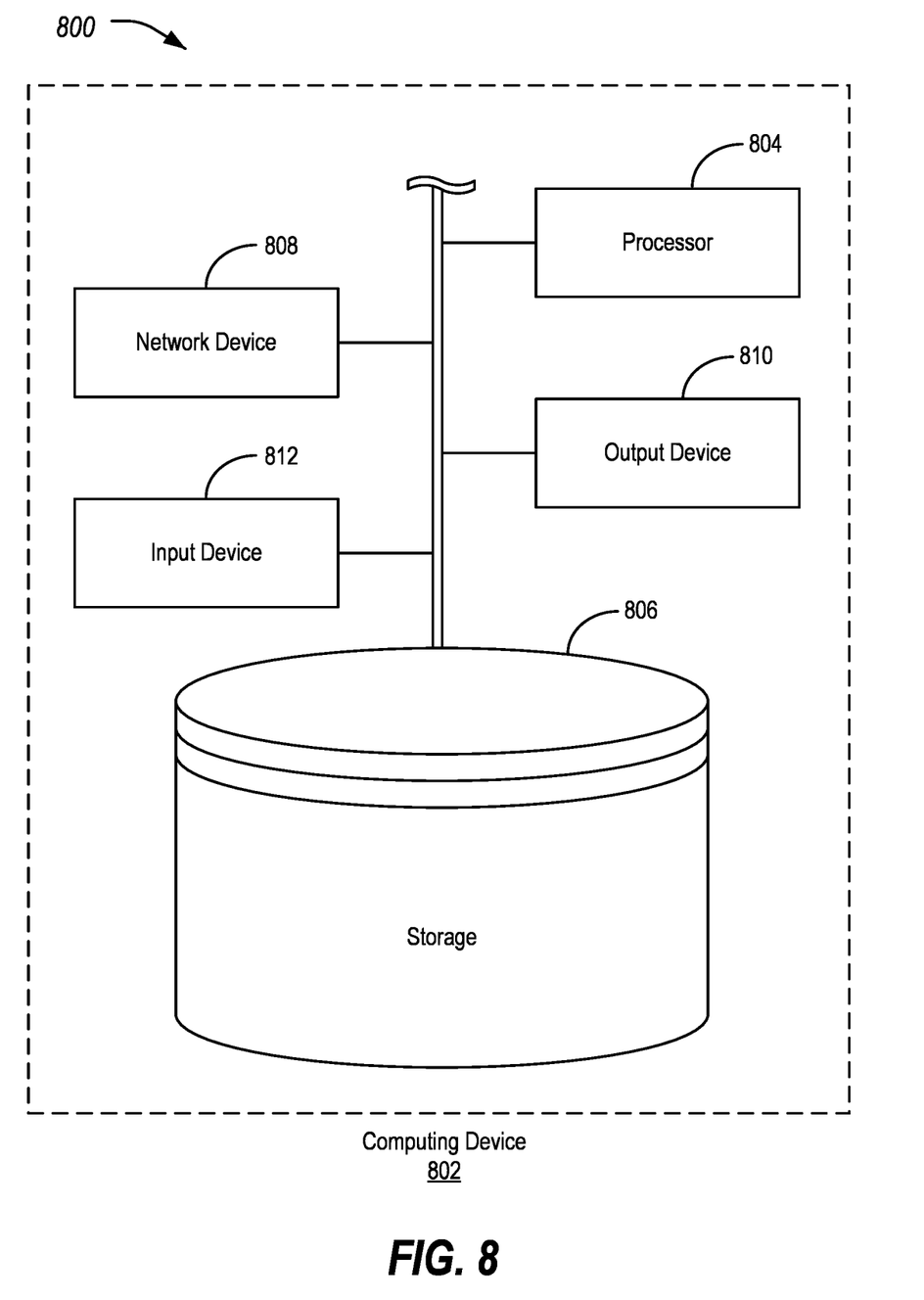
FIG. 8 illustrates an example computing device for performing in-vehicle network diagnostics.

FIG. 8 illustrates an example computing device 802 for performing in-vehicle network diagnostics. Referring to FIG. 8, and with reference to FIGS. 1-7, the ECUs 104, central gateway 110, and cloud server 205 may be examples of such computing devices 802. Computing devices generally include computer-executable instructions, such as those of the cable monitoring data store 206 and/or the cable monitoring service 214, where the instructions may be executable by one or more computing devices 802. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as the machine-learning model 210, the training data 212, the corrective actions 216, the wiring diagnostic data 218, and/or the testing conditions 220, may be stored and transmitted using a variety of computer-readable media.

As shown, the computing device 802 may include a processor 804 that is operatively connected to a storage 806, a network device 808, an output device 810, and an input device 812. It should be noted that this is merely an example, and computing devices 802 with more, fewer, or different components may be used.

The processor 804 may include one or more integrated circuits that implement the functionality of a central processing unit (CPU) and/or graphics processing unit (GPU). In some examples, the processors 804 are a system on a chip (SoC) that integrates the functionality of the CPU and GPU. The SoC may optionally include other components such as, for example, the storage 806 and the network device 808 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 804 executes stored program instructions that are retrieved from the storage 806. The stored program instructions, accordingly, include software that controls the operation of the processors 804 to perform the operations described herein. The storage 806 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 810. The output device 810 may include a graphical or visual display device, such as an electronic display screen, projector, printer, or any other suitable device that reproduces a graphical display. As another example, the output device 810 may include an audio device, such as a loudspeaker or headphone. As yet a further example, the output device 810 may include a tactile device, such as a mechanically raisable device that may, in an example, be configured to display braille or another physical output that may be touched to provide information to a user.

The input device 812 may include any of various devices that enable the computing device 802 to receive control input from users. Examples of suitable input devices that receive human interface inputs may include keyboards, mice, trackballs, touchscreens, voice input devices, graphics tablets, and the like.

The network devices 808 may each include any of various devices that enable the described components to send and/or receive data from external devices over networks (such as the communications network 202). Examples of suitable network devices 808 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for performing in-vehicle network diagnostics, comprising:
   one or more cloud servers, programmed to:
   receive, from a vehicle, wiring diagnostic data that includes information with respect to electrical operation of a plurality of segments of wiring of the vehicle;
   utilize a machine-learning model to analyze the wiring diagnostic data; and
   responsive to the machine-learning model identifying an issue with the electrical operation based on the wiring diagnostic data, send a response including one or more corrective actions to be performed by the vehicle to address the issue.

2. The system of claim 1, wherein the wiring diagnostic data includes cable diagnostic details for the plurality of segments of wiring determined using time-domain reflectometer (TDR) functionality of the vehicle integrated into vehicle controllers and/or inline with the plurality of segments of wiring.

3. The system of claim 2, wherein the cable diagnostic details include measured link quality using the TDR functionality for each of the plurality of segments of wiring and length of cabling for each of the plurality of segments of wiring.

4. The system of claim 1, wherein the wiring diagnostic data includes data transfer diagnostic details that specify information with respect to channel quality for data transfers along each of the plurality of segments of wiring.

5. The system of claim 1, wherein the wiring diagnostic data includes ambient vehicle sensor readings that specify information with respect to one or more of temperature, weather, vehicle speed, vehicle acceleration, vehicle movement, day, or time of day.

6. The system of claim 1, wherein the one or more corrective actions include an indication for the vehicle to seek service.

7. The system of claim 1, wherein the one or more corrective actions include a new routing of vehicle data along the plurality of segments of wiring to be applied to transmitted vehicle data to avoid one of the plurality of segments of wiring that is experiencing the issue.

8. The system of claim 1, wherein the one or more corrective actions include an update to a configuration of the vehicle to reduce data speeds or change an update interval for transmission of data along the plurality of segments to mitigate the issue.

9. The system of claim 1, wherein the one or more cloud servers are further programmed to:
   retrain the machine-learning model utilizing predictive wiring diagnostic data received from a plurality of vehicles, the predictive wiring diagnostic data being selected as being wiring diagnostic data received from the plurality of vehicles before the plurality of vehicles encountered issues, the predictive wiring diagnostic data being used to train the machine-learning model to identify wiring diagnostic data predictive of future issues; and
   utilize the retrained machine-learning model to analyze further wiring diagnostic data received from the vehicle.

10. The system of claim 1, further comprising the vehicle, where the vehicle includes a central gateway in communication with a plurality of vehicle electronic control units (ECUs) over one or more vehicle buses, the vehicle being programmed to send the wiring diagnostic data responsive to occurrence of testing conditions maintained by the vehicle.

11. The system of claim 10, wherein the one or more cloud servers are further programmed to send the testing conditions to the vehicle.

12. The system of claim 10, wherein the testing conditions include the vehicle as reaching one or more intermediate assembly stations during vehicle assembly.

13. The system of claim 10, wherein the testing conditions include one or more of occurrence of vehicle startup, occurrence of passage of a predefined time period, responsive to travel by the vehicle of a predefined distance, responsive to a change in user of the vehicle, an/or responsive to raising of a diagnostic code by one of the plurality of ECUs of the vehicle.

14. A method for performing in-vehicle network diagnostics, comprising:
   receiving, from a vehicle to a cloud system, wiring diagnostic data that includes information with respect to electrical operation of a plurality of segments of wiring of the vehicle;
   utilizing a machine-learning model of the cloud system to analyze the wiring diagnostic data; and
   responsive to the machine-learning model identifying an issue with the electrical operation based on the wiring diagnostic data, sending a response including one or more corrective actions to be performed by the vehicle to address the issue.

15. The method of claim 14, wherein the wiring diagnostic data include one or more of:
   cable diagnostic details for the plurality of segments of wiring determined using time-domain reflectometer (TDR) functionality of the vehicle integrated into vehicle controllers and/or inline with the plurality of segments of wiring, the cable diagnostic details including measured link quality using the TDR functionality for each of a plurality of the segments of wiring and length of cabling for each of the plurality of segments of wiring;
   data transfer diagnostic details that specify information with respect to channel quality for data transfers along each of the plurality of segments of wiring; or
   ambient vehicle sensor readings that specify information with respect to one or more of temperature, weather, vehicle speed, vehicle acceleration, vehicle movement, day, or time of day.

16. The method of claim 14, wherein the one or more corrective actions include one or more of:
   an indication for the vehicle to seek service;

a new routing of vehicle data along the plurality of segments of wiring within the vehicle to be applied to vehicle data to avoid a segment of plurality of segments of wiring that is experiencing the issue; or an update to a configuration of the vehicle to reduce data speeds or change an update interval for transmission of data along the plurality of segments of wiring to mitigate the issue.

17. The method of claim 14, further comprising:

retraining the machine-learning model utilizing predictive wiring diagnostic data received from a plurality of vehicles, the predictive wiring diagnostic data being selected as being wiring diagnostic data received from vehicles before the vehicles encountered issues, the predictive wiring diagnostic data being used to train the machine-learning model to identify wiring diagnostic data predictive of future vehicle issues; and utilizing the retrained machine-learning model to analyze further wiring diagnostic data received from the vehicle.

18. The method of claim 17, further comprising:

sending testing conditions from the cloud system to the vehicle; and receiving the wiring diagnostic data from the vehicle responsive to occurrence of the testing conditions.

19. The method of claim 18, wherein the testing conditions include one or more of:

the vehicle reaching one or more intermediate assembly stations during vehicle assembly; or one or more of occurrence of vehicle startup, occurrence of passage of a predefined time period, responsive to travel by the vehicle of a predefined distance, responsive to a change in user of the vehicle, an/or responsive to raising of a diagnostic code by one of the plurality of ECUs of the vehicle.

20. A non-transitory computer-readable medium comprising instructions for performing in-vehicle network diagnostics that, when executed by one or more cloud servers, cause the one or more cloud servers to perform operations including to:

receive, from a vehicle, wiring diagnostic data that includes information with respect to electrical operation of a plurality of segments of wiring of the vehicle, the wiring diagnostic data including cable diagnostic details for the plurality of segments of wiring determined using time-domain reflectometer (TDR) functionality of the vehicle integrated into vehicle controllers and/or inline with the plurality of segments of wiring, the cable diagnostic details including measured link quality using the TDR functionality for each of a plurality of the segments of wiring and length of cabling for each of the plurality of segments of wiring;

utilize a machine-learning model to analyze the wiring diagnostic data; and responsive to the machine-learning model identifying an issue with the electrical operation based on the wiring diagnostic data, send a response including one or more corrective actions to be performed by the vehicle to address the issue.

* * * * *